(12) United States Patent
Sablak et al.

(10) Patent No.: US 7,742,077 B2
(45) Date of Patent: *Jun. 22, 2010

(54) IMAGE STABILIZATION SYSTEM AND METHOD FOR A VIDEO CAMERA

(75) Inventors: Sezai Sablak, Lancaster, PA (US); Mark Bell, Airville, PA (US)

(73) Assignee: Robert Bosch GmbH, Stuttgart (DE)

( * ) Notice: Subject to any disclaimer, the term of this patent is extended or adjusted under 35 U.S.C. 154(b) by 1316 days.

This patent is subject to a terminal disclaimer.

(21) Appl. No.: 11/200,396

(22) Filed: Aug. 9, 2005

(65) Prior Publication Data

US 2005/0280707 A1 Dec. 22, 2005

Related U.S. Application Data

(63) Continuation-in-part of application No. 10/781,968, filed on Feb. 19, 2004, now Pat. No. 7,382,400.

(51) Int. Cl.
H04N 5/228 (2006.01)
(52) U.S. Cl. .............. 348/208.99; 348/208.1; 348/208.2; 348/208.4; 348/208.12
(58) Field of Classification Search ............ 348/208.99, 348/208.1, 208.2, 208.4, 208.16, 208.12; 396/52, 53, 54; 382/168, 172
See application file for complete search history.

(56) References Cited

U.S. PATENT DOCUMENTS 3,943,561 A 3/1976 Biddlecomb

| | | |
|---|---|---|
| 4,403,256 A | 9/1983 | Green et al. |
| 4,410,914 A | 10/1983 | Siau |
| 4,476,494 A | 10/1984 | Tugayé |
| 4,897,719 A | 1/1990 | Griffin |
| 4,959,725 A | 9/1990 | Mandle |
| 5,012,347 A | 4/1991 | Fournier |

(Continued)

FOREIGN PATENT DOCUMENTS

EP 0557007 A2 8/1993

(Continued)

OTHER PUBLICATIONS

"Computer vision sensor for autonomous helicopter hover stabilization", Carl-Henrik Oertel, SPIE vol. 3088, pp. 121-129, (1977).

(Continued)

*Primary Examiner*—Yogesh K Aggarwal
(74) *Attorney, Agent, or Firm*—Baker & Daniels LLP

(57) ABSTRACT

A video image stabilization system includes a camera having an image capturing device capturing a video image. The camera has a selectively adjustable field of view. A processing device is operably coupled to the camera. The processing device receives signals indicative of the field of view of the camera and images captured by the camera. The processing device automatically tracks movements of at least one object in the images. The processing device determines a stabilizing adjustment for the video image as a function of an unintended change in the field of view of the camera during a time interval between capture of a first image and capture of a second image. The determining is based upon the signals indicative of the field of view and an analysis of the first and second images.

13 Claims, 9 Drawing Sheets

U.S. PATENT DOCUMENTS

| | | | |
|---|---|---|---|
| 5,237,405 A | | 8/1993 | Egusa et al. |
| 5,264,933 A | | 11/1993 | Rosser et al. |
| 5,353,392 A | | 10/1994 | Luquet et al. |
| 5,371,539 A | | 12/1994 | Okino et al. |
| 5,430,480 A | | 7/1995 | Allen et al. |
| 5,436,672 A | | 7/1995 | Medioni et al. |
| 5,438,360 A | | 8/1995 | Edwards |
| 5,491,517 A | | 2/1996 | Kreitman et al. |
| 5,502,482 A | | 3/1996 | Graham |
| 5,517,236 A | | 5/1996 | Sergeant et al. |
| 5,528,319 A | | 6/1996 | Austin |
| 5,563,652 A | | 10/1996 | Toba et al. |
| 5,608,703 A | | 3/1997 | Washisu |
| 5,610,653 A | | 3/1997 | Abecassis |
| 5,627,616 A | | 5/1997 | Sergeant et al. |
| 5,629,984 A | | 5/1997 | McManis |
| 5,629,988 A | | 5/1997 | Burt et al. |
| 5,648,815 A | | 7/1997 | Toba |
| 5,731,846 A | | 3/1998 | Kreitman et al. |
| 5,754,225 A | | 5/1998 | Naganuma |
| 5,798,786 A | | 8/1998 | Lareau et al. |
| 5,798,787 A | | 8/1998 | Yamaguchi et al. |
| 5,801,770 A | | 9/1998 | Paff et al. |
| 5,835,138 A | | 11/1998 | Kondo |
| 5,909,242 A | | 6/1999 | Kobayashi et al. |
| 5,926,212 A | | 7/1999 | Kondo |
| 5,953,079 A | | 9/1999 | Burl et al. |
| 5,963,248 A | | 10/1999 | Ohkawa et al. |
| 5,963,371 A | | 10/1999 | Needham et al. |
| 5,969,755 A | | 10/1999 | Courtney |
| 5,973,733 A | | 10/1999 | Gove |
| 5,982,420 A | | 11/1999 | Ratz |
| 6,006,990 A | * | 12/1999 | Ye et al. ............... 235/454 |
| 6,067,399 A | | 5/2000 | Berger |
| 6,100,925 A | | 8/2000 | Rosser et al. |
| 6,144,405 A | | 11/2000 | Toba |
| 6,154,317 A | | 11/2000 | Segerstrom et al. |
| 6,160,900 A | | 12/2000 | Miyawaki et al. |
| 6,173,087 B1 | | 1/2001 | Kumar |
| 6,181,345 B1 | | 1/2001 | Richard |
| 6,208,379 B1 | | 3/2001 | Oya et al. |
| 6,208,386 B1 | | 3/2001 | Wilf et al. |
| 6,211,912 B1 | | 4/2001 | Shahraray |
| 6,211,913 B1 | | 4/2001 | Hansen et al. |
| 6,263,088 B1 | | 7/2001 | Crabtree et al. |
| 6,295,367 B1 | | 9/2001 | Crabtree et al. |
| 6,384,871 B1 | | 5/2002 | Wilf et al. |
| 6,396,961 B1 | | 5/2002 | Wixson et al. |
| 6,424,370 B1 | | 7/2002 | Courtney |
| 6,437,819 B1 | | 8/2002 | Loveland |
| 6,441,864 B1 | | 8/2002 | Minami et al. |
| 6,442,474 B1 | | 8/2002 | Trajkovic et al. |
| 6,459,822 B1 | | 10/2002 | Hathaway et al. |
| 6,478,425 B2 | | 11/2002 | Trajkovic et al. |
| 6,509,926 B1 | | 1/2003 | Mills et al. |
| 6,628,711 B1 | | 9/2003 | Mathew et al. |
| RE38,420 E | | 2/2004 | Thomas |
| 6,727,938 B1 | | 4/2004 | Randall |
| 6,734,901 B1 | | 5/2004 | Kawahara et al. |
| 6,778,210 B1 | | 8/2004 | Sugahara et al. |
| 6,781,622 B1 | | 8/2004 | Sato et al. |
| 6,809,758 B1 | * | 10/2004 | Jones ............... 348/208.99 |
| 2002/0008758 A1 | | 1/2002 | Broemmelsiek et al. |
| 2002/0030741 A1 | | 3/2002 | Broemmelsiek |
| 2002/0122042 A1 | * | 9/2002 | Bates et al. ............... 345/581 |
| 2002/0140813 A1 | | 10/2002 | Trajkovic et al. |
| 2002/0140814 A1 | | 10/2002 | Gohen-Solal et al. |
| 2002/0167537 A1 | | 11/2002 | Trajkovic |
| 2002/0168091 A1 | | 11/2002 | Trajkovic |
| 2003/0035051 A1 | * | 2/2003 | Cho et al. ............... 348/169 |
| 2003/0137589 A1 | | 7/2003 | Miyata |
| 2003/0227555 A1 | | 12/2003 | Kobayashi et al. |
| 2004/0130628 A1 | | 7/2004 | Stavely |
| 2004/0183917 A1 | * | 9/2004 | von Flotow et al. ..... 348/208.99 |
| 2005/0157169 A1 | | 7/2005 | Brodsky et al. |

FOREIGN PATENT DOCUMENTS

| | | |
|---|---|---|
| EP | 1081955 A2 | 9/2001 |
| GB | 2305051 A | 3/1997 |
| GB | 2316255 A | 2/1998 |
| GB | 2316255 A | 2/1998 |
| GB | 2411310 A | 8/2005 |
| GB | 2414885 A | 12/2005 |
| JP | 62229082 | 10/1987 |
| JP | 03286211 | 12/1991 |
| JP | 08-123784 A | 5/1996 |
| JP | 2001-061137 A | 3/2001 |
| WO | WO 94/28377 | 12/1994 |
| WO | WO 98/47117 A1 | 10/1998 |
| WO | WO 01/69930 A1 | 9/2001 |
| WO | WO 01/69932 A1 | 9/2001 |
| WO | WO 2004/068403 A2 | 8/2004 |

OTHER PUBLICATIONS

"Development of image stabilization system for remote operation of walking robots", Kurazume et al, IEEE vol. 2, pp. 1856-1861, (2000).

"Dynamic Stabilization of a Pan and Tilt Camera for Submarine Image Visualization", Armel Cretual et al., Computer Vision and Image Understanding 79, pp. 47-65, (2000).

"Stabilization, restoration and resolution enhancement of a video sequence captured by a moving and vibrating platform", A. Stern, et al., Applications of Digital Image Processing XXIV, Pgs of SPIE vol. 4472 (2001) pp. 65-74, May 24, 2004.

"A Stable Vision System for Moving Vehicles", Jesse S. Jin et al., IEEE Transactions of Intelleigent Transportation System, vol. 1, No. 1, Mar. 2000, pp. 32-39.

"Camera Tracking for Augmented Reality Media", Bolan Jiang et al., 2000 IEEE, vol. III, pp. 1637-1640.

Haritaoglu, et al., "*W4: Who? When? Where? What? A real Time System for Detecting and Tracking People*," International Conference on Face and Gesture Recognition; Nara, Japan, Apr. 14-16, 1998.

J. Segen and G. Pingali, "*A Camera-based System for Tracking People in Real Time*," In Proc. International Conference on Pattern Recognition, pp. 63-67, 1996.

C.R. Wren, A. Azarbayejani, T. Darrell, and A.P. Pentland, "*Pfinder: Real-time Tracking of the Human Body*," IEEE Trans. Pattern Analysis and Machine Intelligence, 19(7): 780-785, Jul. 1997.

"Fast Normalized Cross-Correlation", J.P. Lewis, expanded version of a paper from Vision Interface, 1995 (reference [10]).

"A Novel Affine Template Matching Method and Its Application to Real-Time Tracking", Ismail Oner Sebe, et al., AST San Diego Lab, STMicroelectronics Inc.

"A simple and effecient template matching algorithm", Frederic Jurie et al., LASMEA—UMR 6602 of CNRS, Blaise-Pascal University, F-63177 Aubiere, France.

"Real Time Robust Template Matching", Frederic Jurie et al., LASMEA—UMR 6602, Universite Blaise-Pascal, F-63177 Aubiere, France, pp. 123-132, (2002).

T.E. Boult, R. Michaels, A. Erkan, P. Lewis, C. Powers, C. Qian, and W. Yin, "*Frame-Rate Multi-Body Tracking for Surveillance*," Proceeding of the DARPA Image Understanding Workshop, Nov. 1998.

I. Haritaoğlu, D. Harwood, and L.S. Davis, "*W4: Real-time surveillance of People and their Activities*," IEEE Trans. Pattern Analysis and Machine Intelligence, 22(8): 809-830, Aug. 2000.

Webpage: www.polywell.com/security/digital1/apps.html Digital Video System Basic System::Applications.

New Product Announcement; Integral Technologies, Inc., First Line DVA Digital Recorder, Mar. 1, 2002.

Product Brochure; Primary Image, Videotracker Digital Video Motion Detector, 1998.

Webpage: www.dvrsecuritysystems.com, DVR Security Systems, Sentry V800 Series Digital Video Recorders.

Webpage: www.intelligentvideosystems.com, Products page, Remote Station.

Webpage: www.spacewalker.com, Shuttle NVS, Digital Video Recorder.

Webpage: www.skywaysecurity.com, Remote Video Surveillance systems, G-MAS Economy 6000 Series Digital Video Recorders.

Product Brochure, Fire Sentry Corporation, VSD-8 Visual Smoke Detection System, 2001.

\* cited by examiner

IMAGE STABILIZATION SYSTEM AND METHOD FOR A VIDEO CAMERA

CROSS REFERENCE TO RELATED APPLICATIONS

This application is a Continuation-in-part of U.S. patent application Ser. No. 10/781,968, entitled IMAGE STABILIZATION SYSTEM AND METHOD FOR A VIDEO CAMERA, filed on Feb. 19, 2004, now U.S. Pat. No. 7,382,400, which is hereby incorporated herein by reference.

BACKGROUND OF THE INVENTION

1. Field of the Invention

The present invention relates to a video camera stabilization system, and, more particularly, to a video camera stabilization system that counteracts unwanted and irregular image motion.

2. Description of the Related Art

There are numerous known video surveillance systems which may be used to track a moving object such as a person or vehicle. Some such systems utilize a fixed camera having a stationary field of view (FOV). To fully cover a given surveillance site with a fixed camera system, however, it will oftentimes be necessary to use a significant number of fixed cameras.

Movable cameras which may pan, tilt and/or zoom may also be used to track objects. The use of a PTZ (pan, tilt, zoom) camera system will typically reduce the number of cameras required for a given surveillance site and also thereby reduce the number and cost of the video feeds and system integration hardware such as multiplexers and switchers associated therewith. Control signals for directing the pan, tilt, zoom movements typically originate from a human operator via a joystick or from an automated video tracking system.

A problem is that, in addition to being intentionally moved as a result of the PTZ control signals, the camera can also be unintentionally moved by external forces, such as air movement or mounting arm vibration. The inadvertent camera movements typically lead to a video image that is "jumpy", and thus unpleasant to observe.

What is needed in the art is a video system capable of stabilizing an image to compensate for inadvertent movement of the camera.

SUMMARY OF THE INVENTION

The present invention provides a video image stabilization system having a camera that captures an image that is larger than the associated image that is displayed on a screen. The system can compensate for inadvertent camera movement, i.e., remove the jumpiness from the displayed image, by adjusting the relative position of the portion of the image that is selected for display based upon the intended change in the field of view of the camera and an analysis of two of the captured images.

A tracking algorithm may require a processor-intensive corner matching routine to assure the correct video is being compared for object motion tracking. In order to free up processor resources to obtain a better tracking rate, the present invention provides a method of matching the video frame being analyzed to the actual pan tilt and zoom positions. The present invention provides a system approach and architecture which allows a video content analysis engine in a digital signal processor to use frame accurate position data in conjunction with a PTZ camera instead of a corner matching routine. The present invention also allows the data to be shared with a host processor for use in privacy masking applications while eliminating variability of reporting time on the pan and tilt data. The present invention provides a method of determining frame accurate position data in an open loop system.

The present invention provides a stabilization system for automated target tracking, referred to herein as "autotracker", that uses a general purpose video processing platform (VPP) that obtains video and camera control information from a PTZ camera. Autotracker eliminates the need for a human to track a target via a joystick. Thus also eliminated are problems associated with human tracking, such as susceptibility to fatigue when involved in tedious tasks, and the inability of humans to concentrate on tracking two or more objects simultaneously. The autotracker may be stabilized by way of software running on the VPP on camera board.

Real-time stabilized auto-tracker is an enabling technology for the reduction of irregular global motion effects, i.e., jitter, while the automated intelligent tracker is running. In this application, the use of a dome camera is very sensitive to vibration while it is moving, i.e., panning, tilting and zooming, and depends upon the size of the sensor and the focal length of the lens. Without stabilization, autotracker may produce a display that is unpleasant to view if there is vibration on the dome camera. Also, there may be no preservation of deliberate, long-term global camera movements to maintain image content.

The present invention stabilizes the autotracker using continuous motion in all directions (pan/tilt/zoom). This feature of the auto-dome camera eliminates the negative effects associated with autotrackers systems without stabilization, thereby resulting in a more natural video motion.

The present invention provides: a stabilization system that is usable with autotracker; a standalone embedded Video Content Analysis (VCA) platform, rather than a PC-based platform, for PTZ cameras; a continuously stabilizing engine that produces a pleasant monitoring system display, rather than a non-stabilized system which is unpleasant to watch; a method to allow the acquisition of non-stationary images, versus the requirement of stationary image acquisition; and a method that allows, simultaneously, entirely automated stabilization and target tracking in real-time.

The invention comprises, in one form thereof, a video image stabilization system including a camera having an image capturing device for capturing a video image. The camera has a selectively adjustable field of view. A processing device operably coupled to the camera receives signals indicative of the field of view of the camera and images captured by the camera. The processing device automatically tracks movements of at least one object in the images. The processing device determines a stabilizing adjustment for the video image as a function of an unintended change in the field of view of the camera during a time interval between capture of a first image and capture of a second image. The determining is based upon the signals indicative of the field of view and an analysis of the first and second images.

The invention comprises, in another form thereof, a video image stabilization system including a video camera having an image-capturing device for capturing images. Each captured image is associated with a field of view. The camera has at least one selectively adjustable parameter. Adjustment of the at least one camera parameter varies the field of view of the camera. A display device displays a selected portion of the images captured by the camera. A processing device is operably coupled to the camera and to the display device. The processing device receives images captured by the camera. The processing device is operable to track movements of an object in the images and compensate for inadvertent movement of the video camera by adjusting the selected portion of the images displayed by the display device. The adjusting is based upon the camera parameter and an analysis of the images.

The invention comprises, in yet another form thereof, a method of stabilizing video images, including capturing a plurality of images with a video camera. A location of an object in each of a first captured image and a second captured image is identified. A field of view of the camera is adjusted during a time interval between the capture of the first image and the capture of the second image. A selected display portion of the first captured image and the second captured image is displayed. The selected display portion of each image is less than the entire captured image. The adjusting step and/or the displaying step is dependent upon the identifying step. A stabilizing adjustment for the second captured image is determined dependent upon the adjusting step and an analysis of the first and second captured images. The stabilizing adjustment includes adjusting a relative location of the selected display portion within the second captured image.

The invention comprises, in a further form thereof, a method of stabilizing video images, including capturing a plurality of images with a video camera. Movement of an object in the images is tracked. A field of view of the camera is varied by use of control signals. A selected portion of each of the plurality of images is displayed. The varying step and/or the displaying step is dependent upon the tracking step. The selected portion that is displayed for at least one of the plurality of images is adjusted. The adjusting step compensates for inadvertent movement of the video camera and is based upon an intended field of view of the camera and an analysis of the images.

An advantage of the present invention is that it provides video images which are stabilized to limit or eliminate the distracting and unpleasant effects caused by inadvertent movements of the camera.

Another advantage of the present invention is that it allows for the stabilization of images acquired while the camera is in motion. Thus, the present invention can compensate for unintentional movement of a pan, tilt, zoom camera, such as that caused by support arm vibration or the effect of wind on the camera housing, even while the camera is actively and purposefully changing its field of view.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 6 is a histogram used in the analysis of two images.

Figure 1:
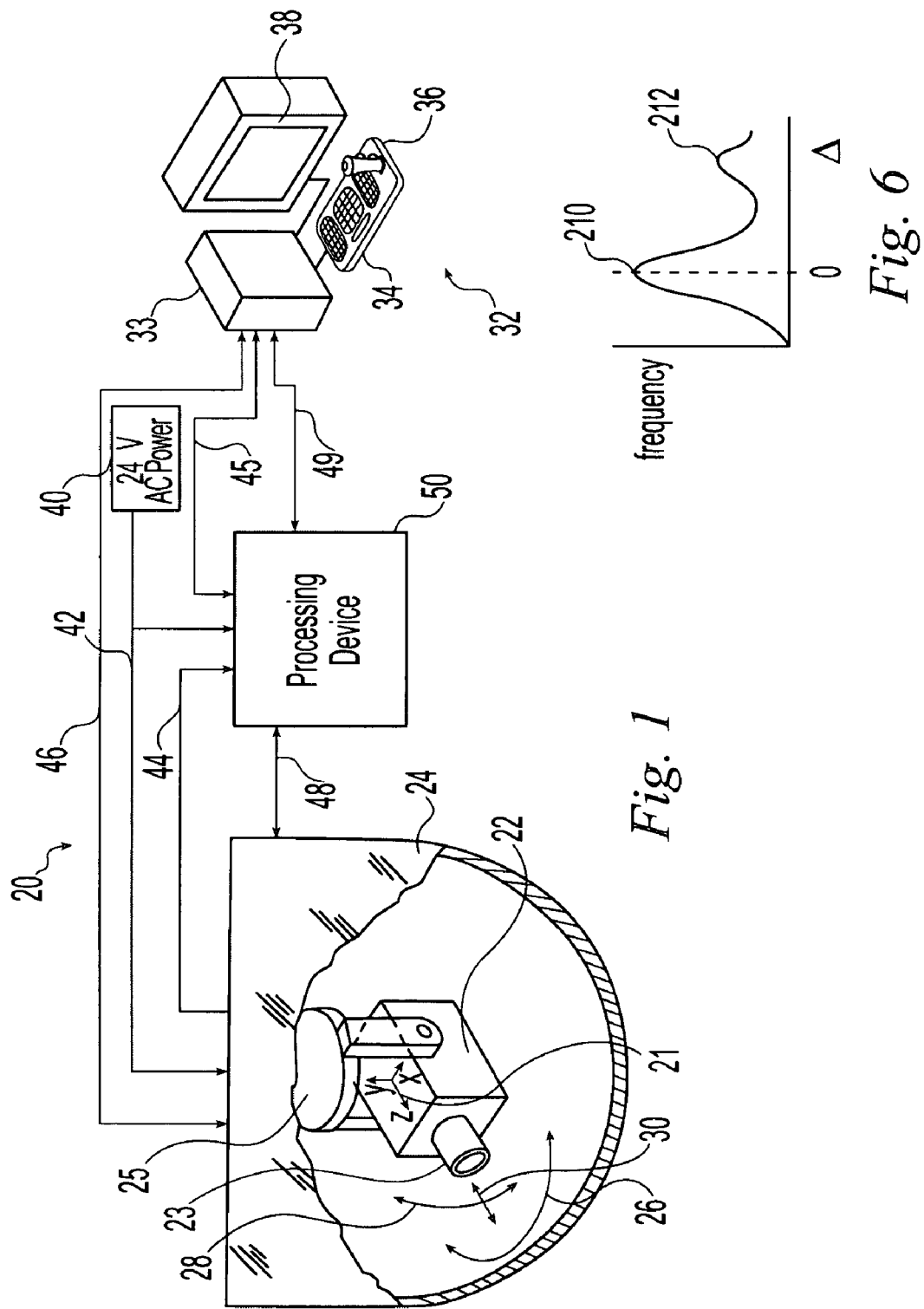
FIG. 1 is a schematic view of a video surveillance system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DESCRIPTION OF THE PRESENT INVENTION

In accordance with the present invention, a video surveillance system 20 is shown in FIG. 1. System 20 includes a camera 22 which is located within a partially spherical enclosure 24 and mounted on support 25. Stationary support 25 may take many forms, such as an outwardly extending support arm extending from an exterior edge of a building which may subject the supported camera to unintentional movement resulting from wind, vibrations generated by the camera motors, nearby machinery or a myriad of other sources. Enclosure 24 is tinted to allow the camera to acquire images of the environment outside of enclosure 24 and simultaneously prevent individuals in the environment being observed by camera 22 from determining the orientation of camera 22. Camera 22 includes a controller and motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion may track movement along the x axis, tilting motion may track movement along the y-axis and focal length adjustment may be used to track movement along the z-axis. In the illustrated embodiment, camera 22 and enclosure 24 may be a Philips AutoDome® Camera Systems brand camera system, such as the G3 or G4 AutoDome® camera and enclosure, which are available from Bosch Security Systems, Inc. formerly Philips Communication, Security & Imaging, Inc. having a place of business in Lancaster, Pa. The basic, advanced, or other models of the G3 or G4 AutoDome® camera may be suitable for use in conjunction with the present invention. A camera suited for use with present invention is described by Sergeant et al. in U.S. Pat. No. 5,627,616 entitled Surveillance Camera System which is hereby incorporated herein by reference.

System 20 also includes a head end unit 32. Head end unit 32 may include a video switcher or a video multiplexer 33. For example, the head end unit may include an Allegiant brand video switcher available from Bosch Security Systems, Inc. formerly Philips Communication, Security & Imaging, Inc. of Lancaster, Pa. such as a LTC 8500 Series Allegiant Video Switcher which provides inputs for up to 64 cameras and may also be provided with eight independent keyboards and eight monitors. Head end unit 32 includes a keyboard 34 and joystick 36 for operator input. Head end unit 32 also includes a display device in the form of a monitor 38 for viewing by the operator. A 24 volt a/c power source 40 is provided to power both camera 22 and a processing device 50 that is operably coupled to both camera 22 and head end unit 32.

Illustrated system 20 is a single camera application, however, the present invention may be used within a larger surveillance system having additional cameras which may be either stationary or moveable cameras or some combination thereof to provide coverage of a larger or more complex surveillance area. One or more VCRs or other form of analog or digital recording device may also be connected to head end unit 32 to provide for the recording of the video images captured by camera 22 and other cameras in the system.

Figure 2:
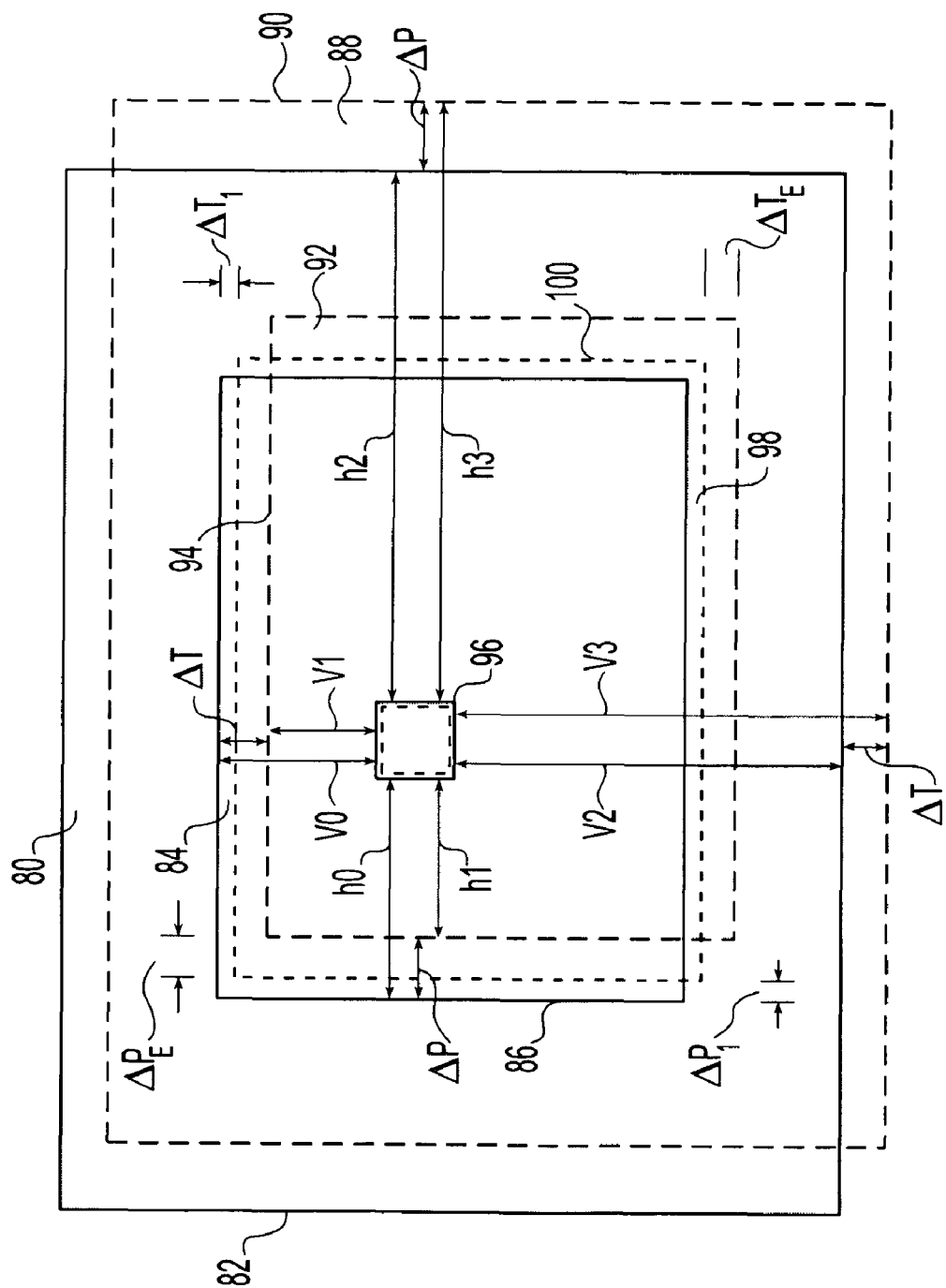
FIG. 2 is a schematic view illustrating a change in a field of view of the camera of FIG. 1 and the resulting images captured by the camera.

The general concepts underlying the operation of an image stabilization system in accordance with the present invention will now be discussed with reference to FIGS. 2 and 3. Camera 22 includes an image-capturing device such as a charge coupled device (CCD) that acquires a four-sided CCD video image 80 defined by CCD image boundary 82. Processing device 50 identifies or selects a central portion of CCD image 80 to be displayed on a screen of monitor 38 for viewing by an operator of system 20. More particularly, processing device 50 identifies a display image 84 defined by display image boundary 86 for viewing on the screen of monitor 38. In one embodiment, the selected portion of the CCD video image, i.e., display image 84, includes approximately between 60% and 90% of the CCD video image. In a preferred embodiment, CCD image 80 can be approximately 30% larger than a display image 84 defined by display image boundary 86. In other words, in a preferred embodiment, approximately 23% of CCD image 80 is not displayed on the screen of monitor 38. However, for ease of illustration, CCD image 80 is shown in FIG. 2 to be approximately between 100% and 200% larger than display image 84. By utilizing a display image that is smaller than the CCD image, processing device 50 can adjust the positions of the boundaries defining the display image relative to the entire CCD image for sequentially acquired images in order to counteract the effects of support arm vibration and other unintended movements of the camera, as described in more detail below.

After a period of time, the field of view (FOV) of camera 22 changes such that a second four-sided CCD image 88 is acquired. A second CCD image boundary 90 defines the limits of the CCD image 88. FIG. 2 schematically illustrates the two images 80, 88 having different fields of view acquired by camera 22 and the extent to which the two images overlap.

The change in the FOV of camera 22 can be due to both intended and unintended, i.e., inadvertent, movements of camera 22. The intended movement of camera 22 that occurs can be due to panning, tilt and zoom control signals sent to camera 22 from head end unit 32. That is, the field of view of camera 22 can be varied by use of the control signals. Any unintended or inadvertent movement of camera 22 may be due to external forces, such as air movement or mounting arm vibration.

An intermediate, unadjusted display image 92 from CCD image 88, defined by an intermediate, unadjusted display image boundary 94, is identified by processing device 50 but is not displayed on the screen of monitor 38. Unadjusted display image 92 includes a portion of CCD image 88 that corresponds to the portion of CCD image 80 that is included in display image 84. That is, the relative position of display image 92 to CCD image boundary 90 is the same as the relative position of display image 84 to CCD image boundary 82, with the distances between the display image boundaries and the corresponding CCD image boundaries being approximately equal for display images 84 and 92. For example, display images 84 and 92 may each be centered in their respective CCD images 80, 88.

Figure 3:
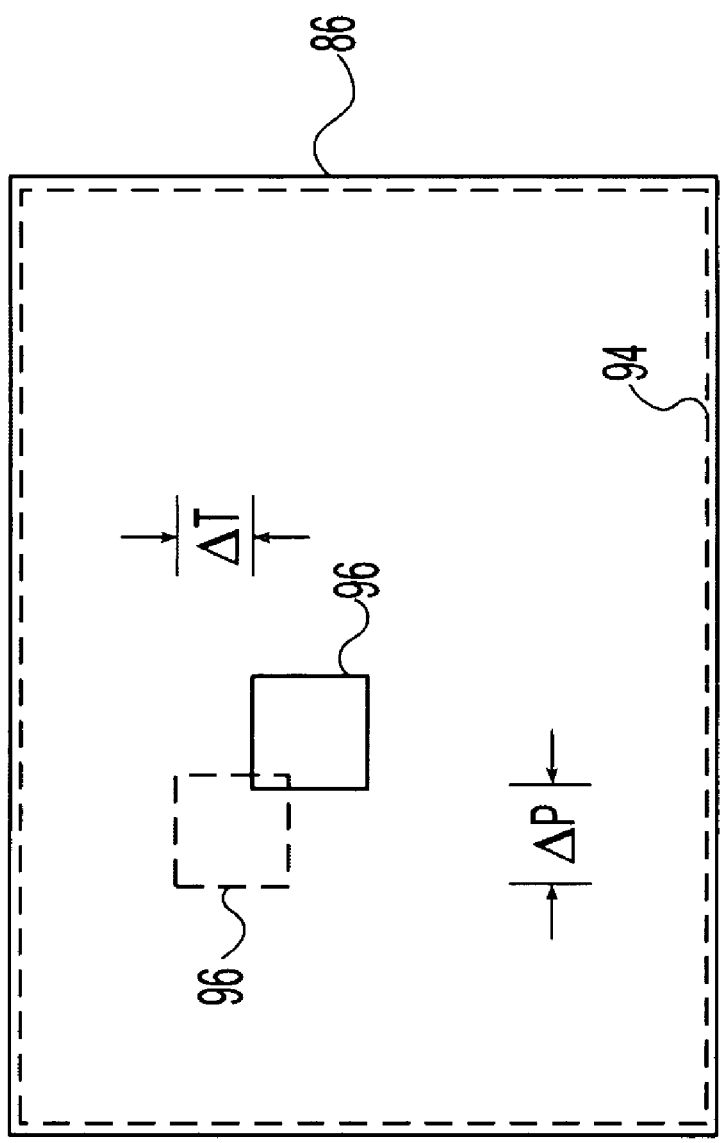
FIG. 3 is a schematic view of a portion of the captured images of FIG. 2.

FIGS. 2 and 3 schematically illustrate two images acquired by camera 22 and the effects and relationship between the intended motion of the camera, the actual motion of the camera and the unintentional motion of the camera with regard to these two images. A common stationary feature 96 is identified in each of these images to clarify the relative movement of the FOV that has taken place between the acquisition of the two images. The same stationary feature 96 is shown in both solid and dashed lines in FIG. 2 to indicate that feature 96 is present in both CCD image 80 and CCD image 88. The actual horizontal translation $\Delta P$ (generally corresponding to panning movement of camera 22) and vertical translation $\Delta T$ (generally corresponding to tilting movement of camera 22) of feature 96 relative to the CCD image boundaries 82, 90 that actually took place in the time period between the acquisition of the two CCD images 80, 88 is schematically represented in FIG. 2.

In FIG. 2, the positions CCD images 80 and 88 are depicted relative to stationary feature 96. As can be seen in FIG. 2, images 80 and 88 overlap to a considerable extent but the FOV of camera 22 has changed between the acquisition of CCD image 80 to the more recently captured CCD image 88. The change in the FOV of camera 22 is best shown in FIG. 3, wherein display images 84, 92 are superimposed on one another as they would successively appear on the screen of monitor 38 without any adjustment of display image boundaries 86, 94 for image stabilization purposes.

The vertical, i.e., in the tilt direction, change in position $\Delta T$, and the horizontal, i.e., in the panning direction, change in position $\Delta P$ of feature 96 relative to the display image boundary 86, 94 is representative of the vertical (tilt) movement and horizontal (pan) movement of camera 22 that occurred between the capturing of CCD images 80 and 88 by camera 22 and is equivalent to the change in position of feature 96 relative to CCD image boundaries 82 and 90.

In other words, $\Delta T$ is equivalent to the difference between vertical distances v0 and v1 between feature 96 and corresponding horizontal edges of display image boundaries 86, 94, respectively. That is, $\Delta T = |v0-v1|$. Similarly, $\Delta P$ is equivalent to the difference between horizontal distances h0 and h1 between feature 96 and corresponding vertical edges of display image boundaries 86, 94, respectively. That is, $\Delta P = |h0-h1|$. Alternatively, $\Delta T$ may be said to be equivalent to the difference between vertical distances v2 and v3 between feature 96 and corresponding horizontal edges of CCD image boundaries 82, 90, respectively. That is, $\Delta T = |v2-v3|$. Similarly, $\Delta P$ is equivalent to the difference between horizontal distances h2 and h3 between feature 96 and corresponding vertical edges of CCD image boundaries 82, 90, respectively. That is, $\Delta P = |h2-h3|$.

The determination of the values of $\Delta T$ and $\Delta P$ is performed by processing device 50 based upon an analysis of the content of the two CCD images 80, 88. Matching techniques which may be used to register or align two images having overlapping content are well known in the art and used in a wide variety of computer vision and video processing applications. Two well-known methods are normalized correlation-based template matching and feature matching. For example, the identification of a stationary object such as feature 96 in each of the two images might be accomplished using a feature matching approach. One well known method of identifying features in video images is a corner detection method which analyzes the images to identify locations, or corners, in the image where there is a relatively sharp change in the intensity level of nearby pixels. These corners are then compared and matched in the two separate images.

Although such a feature matching approach can be employed with the present invention, the illustrated embodiment employs a template matching approach instead. Various template matching approaches are known in the art. Two well known approaches to template matching are a sum of square differences approach and a normalized cross-correlation approach. A sum of square differences approach typically relies upon the following mathematical relationship:

$$E = \sum_i \sum_j \|I(x'_i, y'_j) - M(x_i, y_j)\|^2, \quad (1)$$

where E is the total error, I is the image, M is the model template, (x, y) are the model image coordinates, and (x', y') are the transformed image coordinates. To register the two images, the total error E is minimized. In the example of FIG. 2, first display image 84 corresponds to the model template, M, the difference between x and x' corresponds to ΔP and the difference between y and y' corresponds to ΔT. The relation between the transformed image coordinates and the model image coordinates is defined by a motion model. Different motion models can be used and an affine transformation as presented below models rotation, shearing, and translation:

$$\begin{bmatrix} x' \\ y' \\ 1 \end{bmatrix} = \begin{bmatrix} a_0 & a_1 & a_2 \\ a_3 & a_4 & a_5 \\ 0 & 0 & 1 \end{bmatrix} \begin{bmatrix} x \\ y \\ 1 \end{bmatrix} \quad (2)$$

This motion model (2) requires at least 3 point pairs between the current image (second CCD image 88) and the model image (first display image 84).

Although a sum of square differences approach can be used with the present invention, the illustrated embodiment utilizes a normalized cross-correlation approach instead. Template matching using cross-correlation is based upon squared Euclidean distances:

$$d^2_{f,t}(u, v) = \sum_{x,y} [f(x, y) - t(x - u, y - v)]^2 \quad (3)$$

Wherein $f$ is the image, e.g., second CCD image 88, and the summation is over x, y under the window, e.g., first display image 84, containing a feature t positioned at (u, v). The expansion of $d^2$ provides:

$$d^2_{f,t}(u, v) = \sum_{x,y} [f^2(x, y) - 2f(x, y)t(x - u, y - v) + t^2(x - u, y - v)] \quad (4)$$

The term $\Sigma t^2$ (x−u, y−v) is constant. If the term $\Sigma f^2$ (x, y) is approximately constant then a measure of the similarity between the image and the feature is provided by the remaining cross-correlation term:

$$c(u, v) = \sum_{x,y} f(x, y)t(x - u, y - v) \quad (5)$$

There are several disadvantages, however, to using this term for template matching and, oftentimes, a correlation coefficient is used instead. The correlation coefficient may be obtained by normalizing the image and feature vectors to unit length, providing:

$$\gamma(u, v) = \frac{\sum_{x,y} [f(x, y) - \bar{f}_{u,v}][t(x - u, y - v) - \bar{t}]}{\left\{ \sum_{x,y} [f(x, y) - \bar{f}_{u,v}]^2 \sum_{x,y} [t(x - u, y - v) - \bar{t}]^2 \right\}^{0.5}} \quad (6)$$

where t is the mean of the feature and $\bar{f}_{u,v}$ is the mean of $f(x, y)$ in the region under the feature. This relationship, known to those having ordinary skill in the art, is commonly referred to as normalized cross-correlation. By maximizing the normalized correlation between the first display image 84 and the second CCD image 88, processing device 50 can determine a value for ΔT and ΔP.

In addition to determining the actual change in the field of view as indicated by ΔT and ΔP, processing device 50 also determines the intended change, if any, in the field of view, FOV, of camera 22. In FIG. 2, the intended change in the FOV in the vertical (tilting) and horizontal (panning) directions respectively correspond to $\Delta T_1$ and $\Delta P_1$. For example, when the camera is intentionally panned or tilted, there will be a change of the FOV of the camera. In FIG. 2, this intentional change in the FOV of the camera corresponds to $\Delta T_1$ and $\Delta P_1$ wherein $\Delta T_1$ is a vertical image distance corresponding to the intentional tilting of camera 22 and $\Delta P_1$ is a horizontal image distance corresponding to the intentional panning of camera 22.

In the illustrated embodiment, camera 22 communicates to processing device 50 frame-based synchronized information on the pan, tilt and zoom position of camera 22 with each image acquired by camera 22. Processing device 50 utilizes the pan, tilt and zoom settings associated with each of the two images 80, 88 to determine the intended change, if any, in the pan, tilt and zoom positions of camera 22 and, thus, the magnitude and direction of $\Delta T_1$ and $\Delta P_1$.

The intended change in the FOV can also be determined by alternative methods. For example, processing device 50 can analyze the panning, tilt and zoom control signals sent to camera 22 to determine the intended change in the FOV. Such control signals may originate from head end unit 32, e.g., due to the manual manipulation of joystick 36, and be communicated to processing device 50 directly or through camera 22. Alternatively, the camera control signals may originate from processing device 50, e.g., camera control signals generated by an automatic intruder tracking program. Alternatively, the camera control signals may be originated by another source and communicated to processing device 50 or processing device 50 may determine the intended change in the display image by analyzing other data gathered from system 20.

Once both the actual change in the FOV of the camera, as represented by ΔT and ΔP, and the intended change in the FOV of the camera, as represented by $\Delta T_1$ and $\Delta P_1$, are known, it can be determined whether there has been any unintentional movement of the camera in either or both of the vertical (tilting) and horizontal (panning) directions. The values $\Delta T_E$ and $\Delta P_E$ represent the difference between the actual change in the FOV ($\Delta T$ and $\Delta P$) and the intended change in the FOV ($\Delta T_1$ and $\Delta P_1$) for the two sequential images, i.e., the change in the FOV that is due to the inadvertent movement of camera 22. Processing device 50 compensates for such inadvertent movement of camera 22 by adjusting the relative position of the display image within the CCD image based upon the values of $\Delta T_E$ and $\Delta P_E$. In FIG. 2, an adjusted display image 98 defined by adjusted display boundary 100 would be displayed on the screen of monitor 38.

When communicating images to head end unit 32 for display on monitor screen 38, processing device 50 can clip the images and forward only the selected display image portion, e.g., display images 84, 98, or it may forward the entire CCD image, e.g., CCD images 80, 88, together with the coordinates of the display image boundaries, e.g., display boundaries 86, 100.

As long as the entire adjusted display image 98 is available on CCD image 88, adjusted display image 98 can be displayed on the screen of monitor 38. The outer edges of the selected portion of the video image, i.e., the display image boundary, and the outer edges of the CCD video image are separated by margins on all four sides. The adjustment of the display image is, thus, limited to width of the corresponding margin. That is, the extent to which the display image can be repositioned within the CCD image is limited by a threshold value corresponding to the size difference between the display image and the CCD image. The size of the margins may be selected based upon the anticipated magnitude of the vibrations or other unintended movements that will be encountered by the surveillance camera.

A key feature provided by the present invention is that it not only stabilizes the display image while the camera is stationary, but also provides for the stabilization of the display image while the FOV of the camera is being adjusted. As described above, in addition to the adjustable panning and tilt angles of camera 22, camera 22 also has an adjustable zoom setting. The preceding discussion concerning the determination of $\Delta T$ and $\Delta P$; $\Delta T_1$ and $\Delta P_1$; and $\Delta T_E$ and $\Delta P_E$ did not specifically address the situation where the change in the FOV involves a change in the zoom setting of camera 22, i.e., a change in the focal length of the lens of camera 22, in addition to panning or tilting movement of the camera. The vibration of camera 22 or of the structure supporting camera 22 is not likely to result in an unintentional change in the zoom setting of camera 22. As a result, the zoom setting communicated from camera 22 to processing device 50 is assumed to be correct.

An intentional and precise change in the zoom setting between the acquisition of images 80, 88, however, will impact the image stabilization process by altering the relative size of the content of images 80, 88. Alternative embodiments of the present invention may address such a change in the zoom setting of camera 22 in alternative manners. The simplest approach is to only perform the image stabilization process when the two sequential images being analyzed by processing device 50 have the same zoom setting. This approach will suspend the operation of the image stabilization process when the focal length of camera 22 is being actively changed. For some applications where the focal length of the camera is subject to relatively few changes or where the camera does not include an adjustable focal length, this approach may not appreciably degrade the value of the image stabilization system. Moreover, when the focal length is being actively changed, the image is undergoing a noticeable transformation which is typically brief and wherein small unintentional image translations will not be as distractive as when the camera is stationary or being subjected to only panning and/or tilting movements.

It is also possible to continue to perform the image stabilization process as the focal length of camera 22 is being changed. If this approach is taken, at least one of the two images being compared, i.e., first and second CCD images 80, 88, must be transformed so that the objects depicted in each of the images are depicted at a common scale and can be aligned. To accomplish this, geometric transforms may be used to modify the position of each pixel within the image. Another way to think of this is as the moving of all pixels from one location to a new location based upon the camera motion. One such method for transforming a first image to align it with a second image wherein the camera was adjusted between the acquisition of the two images is discussed by Trajkovic in U.S. Pat. App. Pub. No. 2002/0167537 A1 entitled Motion-Based Tracking With Pan-Tilt-Zoom Camera which is hereby incorporated herein by reference.

Alignment of consecutive images acquired at different focal lengths requires translation as well as scaling and rotation of one image to align it with the previous image. Of these three operations translation is the simplest. Warping, a process in which each pixel is subjected to a general user-specified transformation, may be necessary to reduce, expand, or modify an image to a standard size before further processing can be performed. Images produced by such geometric operations are approximations of the original. The mapping between the two images, the current image, e.g., $I_1$, and a reference image, e.g., $I_2$, is defined by:

$$p' = sQRQ^{-1}p = Mp \tag{7}$$

where p and p' denote the homographic image coordinates of the same world point in the first and second images, s denotes the scale image (which corresponds to the focal length of the camera), Q is the internal camera calibration matrix, and R is the rotation matrix between the two camera locations.

Alternatively, the relationship between the image projection coordinates p and p', i.e., pixel locations (x, y) and (x', y'), of a stationary world point in two consecutive images may be written as:

$$x' = \frac{m_{11}x + m_{12}y + m_{13}}{m_{31}x + m_{32}y + m_{33}} \tag{8}$$

$$y' = \frac{m_{21}x + m_{22}y + m_{23}}{m_{31}x + m_{32}y + m_{33}} \tag{9}$$

Where $\lfloor m_{ij} \rfloor_{3 \times 3}$ is the homography matrix M that maps (aligns) the first image to the second image.

The main task in such image alignment is to determine the matrix M. From equation (7), it is clear that given s, Q and R it is theoretically straightforward to determine matrix M. In practice, however, the exact values of s, Q, and R are often not known. Equation (7) also assumes that the camera center and the center of rotation are identical, which is typically only approximately true. However, this assumption may be sufficiently accurate for purposes of providing image stabilization. In the illustrated embodiment, camera 22 provides data, i.e., pan and tilt values for determining R and zoom values for determining s, on an image synchronized basis and with each image it communicates to processing device 50.

With this image specific data, the translation, rotation, and scaling of one image to align it with the second image can then be performed using the homographic method outlined above. In this method, a translation is a pixel motion in the x or y direction by some number of pixels. Positive translations are in the direction of increasing row or column index: negative ones are the opposite. A translation in the positive direction adds rows or columns to the top or left to the image until the required increase has been achieved. Image rotation is performed relative to an origin, defined to be at the center of the motion and specified as an angle. Scaling an image means making it bigger or smaller by a specified factor. The following approximations may be used to represent such translation, rotation and scaling:

$$x' = s(x \cos \alpha - y \sin \alpha) + t_x$$

$$y' = s(y \sin \alpha + x \cos \alpha) + t_y \qquad (10)$$

wherein
s is the scaling (zooming) factor.
$\alpha$ is the angle of rotation about the origin;
$t_x$ is the translation in the x direction; and
$t_y$ is the translation in the y direction.
By introducing new independent variables $a_1 = s \cos \alpha$ and $a_2 = s \sin \alpha$, equation (10) becomes:

$$x' = a_1 x - a_2 y + t_x$$

$$y' = a_2 x + a_1 y + t_y \qquad (11)$$

After determining $a_1$, $a_2$, $t_x$ and $t_y$, the two images, $I_1$ and $I_2$, can be aligned. If these values are obtained using zoom, pan and tilt values obtained directly from the camera, $t_x$ and $t_y$ will correspond to $\Delta P_1$ and $\Delta T_1$. If the transformed images display global image motion and are not properly aligned by this process, unintentional movement has occurred and the values of $\Delta P_E$ and $\Delta T_E$ can be determined for these transformed images using normalized cross-correlation.

Figure 4:
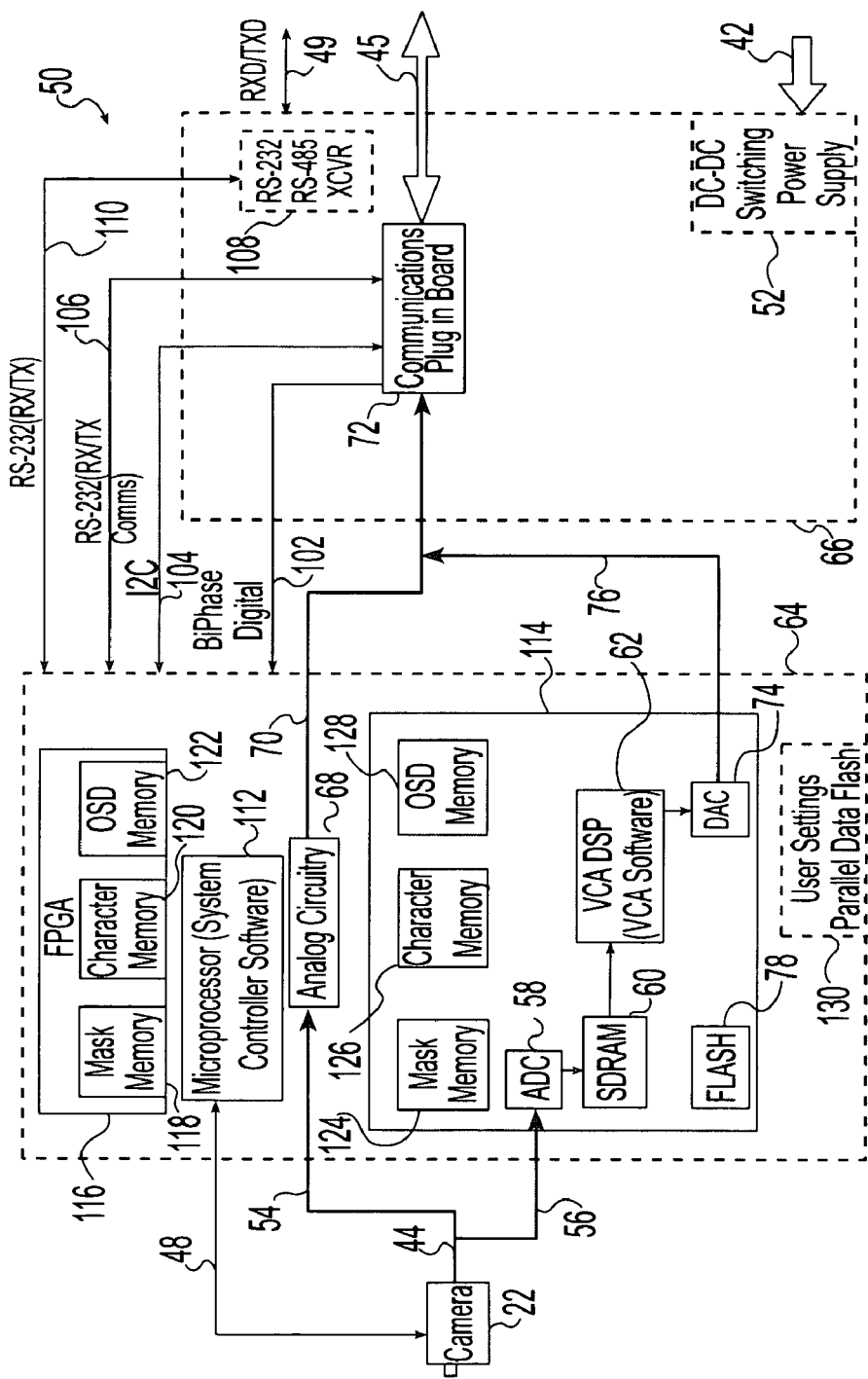
FIG. 4 is a block diagram of the processing device of FIG. 1.

The hardware architecture of processing device 50 is schematically represented in FIG. 4. In the illustrated embodiment, processing device 50 includes a system controller board 64 in communication with a power supply/IO board 66. A power line 42 connects power source 40 to converter 52 in order to provide power to processing device 50. Processing device 50 receives a raw analog video feed from camera 22 via video line 44, and video line 45 is used to communicate video images to head end unit 32. In the illustrated embodiment, video lines 44, 45 are coaxial, 75 ohm, 1 Vp-p and include BNC connectors for engagement with processing device 50. The video images provided by camera 22 can be analog and may conform to either NTSC or PAL standards. When processing device 50 is inactive, i.e., turned off, video images from camera 22 can pass through processing device 50 to head end unit 32 through analog video line 54, analog circuitry 68, analog video line 70 and communications plug-in board 72. Board 72 can be a standard communications board capable of handling biphase signals and including a coaxial message integrated circuit (COMIC) for allowing two-way communication over video links.

Via another analog video line 56, an analog to digital converter 58 receives video images from camera 22 and converts the analog video signal to a digital video signal. After the digital video signal is stored in a buffer in the form of SDRAM 60, the digitized video images are passed to video content analysis digital signal processor (VCA DSP) 62. The video stabilization algorithm described above with reference to FIGS. 2 and 3 is performed in VCA DSP 62. The adjusted display image is sent to digital to analog converter 74 where the video signal is converted to an analog signal. The resulting annotated analog video signal is sent via analog video lines 76 and 70 to communications plug-in board 72, which then sends the signal to head end unit 32 via video line 45.

In the illustrated embodiment, video input to system controller board 64 is limited to 1 Vp-p and if the video signal exceeds 1 Vp-p it will be clipped to 1 Vp-p. However, alternative embodiments having a greater or lesser capacity may also be employed with the present invention. Processor 62 may be a TriMedia TM-1300 programmable media processor available from Philips Electronics North America Corporation. At start up, processor 62 loads a bootloader program. The boot program then copies the VCA application code from a memory device such as flash memory 78 to SDRAM 60 for execution. In the illustrated embodiment, flash memory 78 provides 1 megabyte of memory and SDRAM 60 provides eight megabytes of memory. Since the application code from flash memory 78 is loaded on SDRAM 60 upon start up, SDRAM 60 is left with approximately seven megabytes of memory for video frame storage.

In the embodiment shown in FIG. 4, system controller board 64 is connected to communications plug-in board 72 via a biphase digital data bus 102, an I2C data bus 104, and an RS-232 data bus 106. System controller board 64 is connected to an RS-232/RS-485 compatible transceiver 108 via RS-232 data bus 110. A line 49, which can be in the form of an RS-232 debug data bus, communicates signals from head end unit 32 to processing device 50. The signals on line 49 can include signals that can be modified by processing device 50 before being sent to camera 22. Such signals may be sent to camera 22 via line 48 in communication with microprocessor 112. Microprocessor 112 can operate system controller software and may also be in communication with VCA components 114. Thus, VCA components such as VCA DSP 62 can send signals to camera 22 via microprocessor 112 and line 48.

System controller board 64 may also include a field programmable gate array 116 including a mask memory 118, a character memory 120, and an on screen display (OSD) memory 122. Similarly, VCA components 114 may include a mask memory 124, a character memory 126, and an on screen display (OSD) memory 128. These components may be used to mask various portions of the image displayed on screen 38 or to generate textual displays for screen 38. Finally, system controller board 64 can include a parallel data flash memory 130 for storage of user settings.

In the illustrated embodiment, the only necessary commands conveyed to processing device 50 that are input by a human operator are on/off commands, however, even these on/off commands may be automated in alternative embodiments. Such on/off commands and other serial communications are conveyed via bi-phase line 46 between head end unit 32 and camera 22, and between processing device 50 and camera 22 via line 48. In the illustrated embodiment, processing device 50 is provided with a sheet metal housing and mounted proximate camera 22, however, processing device 50 may also be mounted employing alternative methods and at alternative locations. Alternative hardware architecture may also be employed with processing device 50. Such hardware should be capable of running the software and processing at least approximately five frames per second for good results. It is also noted that by providing processing device 50 with a sheet metal housing its mounting on or near a PTZ camera is facilitated and system 20 may thereby provide a stand alone embedded platform which does not require a personal computer-based image stabilization system. If desired, however, the present invention may also be employed using a personal computer based system.

Processing device 50 can perform several functions, including capturing video frames acquired by camera 22, identifying a stationary feature in the video frames, determining the intended change in the camera FOV based upon signals sent to or received from camera 22, identifying a stationary feature and determining the actual change in the camera FOV, comparing the intended and actual change in the camera FOV to determine the magnitude of the image translations resulting from the unintentional motion of the camera and selecting display image coordinates to counteract the translations resulting from the unintentional motion of the camera. Processing device 50 may also be used to perform an automated tracking function. For example, processing device 50 may also provide an automated tracking system wherein processing device 50 is used to identify moving target objects in the FOV of the camera and then generate control signals which adjust the pan, tilt and zoom settings of the camera to track the target object and maintain the target object within the FOV of the camera. As the pan, tilt and zoom settings of the camera are automatically adjusted to track the target object, the images displayed by the system may be stabilized by utilizing an image stabilization system in accordance with the present invention. An example of an automated tracking system that may be employed by system 20 is described by Sablak et al. in U.S. patent application Ser. No. 10/306,509 filed on Nov. 27, 2002 entitled "VIDEO TRACKING SYSTEM AND METHOD" the disclosure of which is hereby incorporated herein by reference. An image stabilization system in accordance with the present invention may also be employed to stabilize images wherein the camera is being manually adjusted, such as by the manual manipulation of joystick 36 or in other applications.

Figure 5:
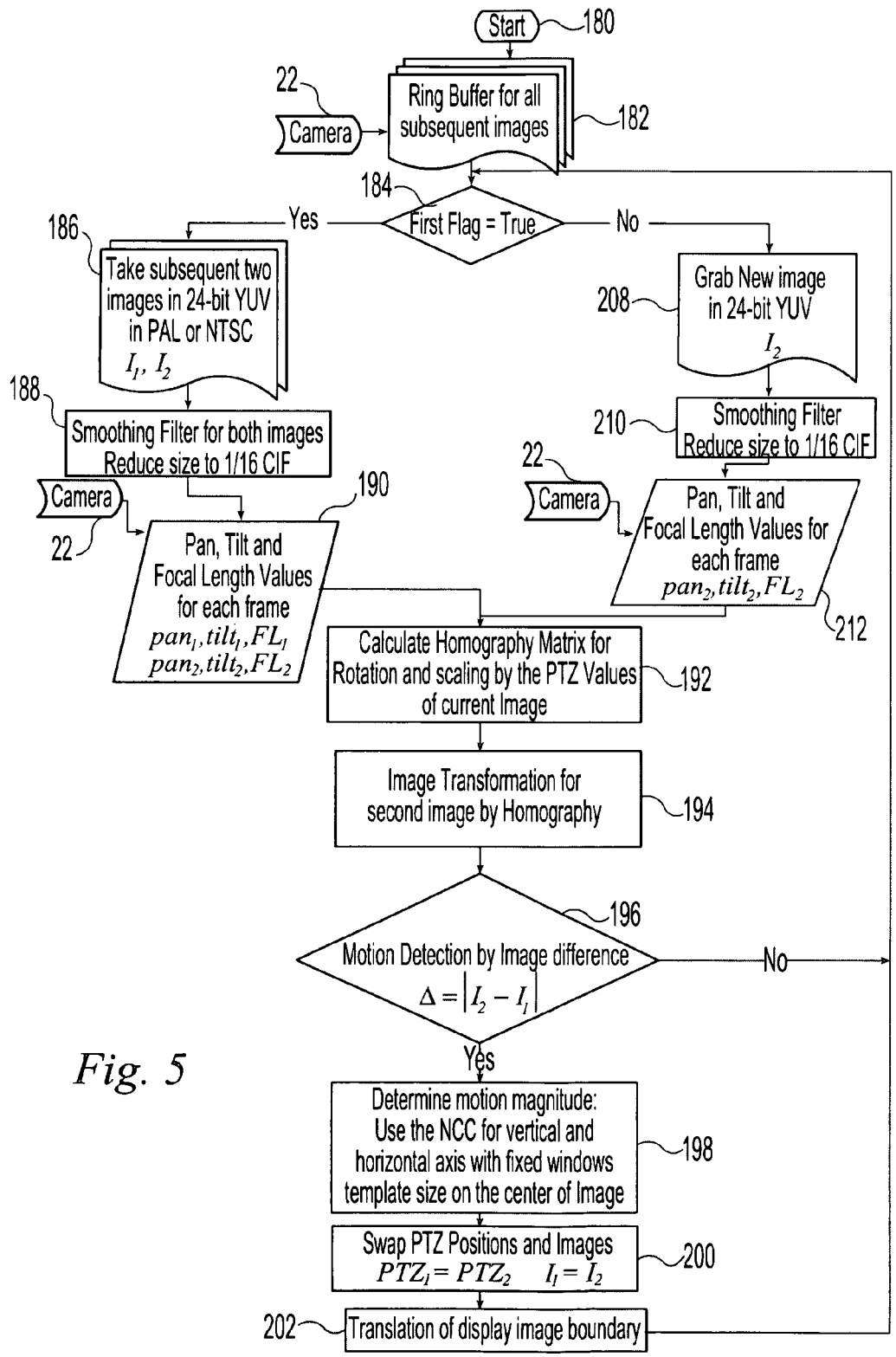
FIG. 5 is a flowchart representing one embodiment of the operation of the video surveillance system of FIG. 1.

FIG. 5 provides a flow chart which graphically illustrates the general logic of an embodiment of the video stabilization algorithm used by system 20 as described above. As shown in FIG. 5, after turning processing device 50 on, it is initialized at step 180 by copying the application code from flash memory 78 to SDRAM 60 for execution. Block 182 represents the remaining memory of SDRAM 60 which is available as a ring buffer for storage of video image frames and data associated with each frame received from camera 22 and stored for processing by processor 62. At decision block 184, processor 62 determines if the first flag is true. The first flag is true only when no images from camera 22 have been loaded to SDRAM 60 for analysis by processor 62. Thus, when processing device 50 is turned on, the first time decision block 184 is encountered, the first flag will be true and processor 62 will proceed to block 186. Block 186 represents the grabbing of two images by processor 62. Processor 62 then proceeds to block 188 where a smoothing filter is applied to each image. Application of the smoothing filter involves taking two sub-samples of the images. The first sub-sampling step creates a QCIF resolution sub-sample (i.e., an image having a quarter of the resolution of the original NTSC or PAL CIF resolution image) of the current $I_1$ and $I_2$ images. The sub-sampling process groups adjacent pixels together to define an average value for the grouped pixels. The purpose of the sub-sampling process is to reduce the time consumed by the computational processes involve in analyzing the image. A second sub-sample of the first sub-sample is then taken resulting in images having 1/16 the resolution of the original CIF resolution images to thereby further increase the speed of the image stabilization process. Block 190 represents the acquisition of the pan, tilt and focal length (i.e., zoom) values for each of the images from the camera. (This data represents the intended values and does include the unintentional motion components of the pan and tilt values.) Although block 190 is shown at a location following the acquisition of the images, the pan, tilt and zoom data may be communicated by camera 22 to processing device 50 simultaneously with the images.

Next, block 192 represents the calculating of a homography matrix for rotation and scaling using the pan, tilt and zoom values of the current image. Then, in block 194, an image transformation is performed by homography to align the second image on to the first image. (If no pan, tilt or zoom adjustments to the camera have been made during the time interval between the acquisition of the two images, no transformation of the images is required.)

At block 196, the image difference of the two aligned images is calculated to determine if any motion is present in the images. Thus, after aligning images $I_1$ and $I_2$, the image difference, $\Delta$, is calculated in accordance with the following equation:

$$\Delta = |I_2 - I_1| \tag{12}$$

A histogram of these differences is then calculated. The stationary background of the image will typically be responsible for generating the largest peak in the histogram. Thus, if the largest peak is centered around zero, the background of the two images is aligned and there has not been any unintentional camera movement during the interval between the acquisition of the two images. If this is the case, the process returns to decision box 184. If the largest peak in the histogram is not centered around zero, this indicates global motion, i.e., the background is in motion. This is interpreted as indicating unintentional motion of the camera and the process proceeds to box 198. It is also possible that a moving object will be located in the acquired images. If such a moving object is present in the images, the histogram will typically have two peaks associated with it, one corresponding to the background and one corresponding to the moving object. If this is the case, the background of the image is assumed to take up more area of the image than the moving object and the largest peak value is used to make the above determination. In other words, the histogram is evaluated to determine whether the largest peak of the histogram is centered on zero, indicating the absence of unintentional camera movement, or whether the largest peak indicates global movement, signifying the presence of unintentional camera movement. For example, FIG. 6 schematically depicts a histogram of image differences wherein the primary peak is centered on zero, indicating no unintentional camera movement, and also including a secondary peak 212 that is not centered on zero thereby indicating the presence of a moving object within the images.

If unintentional camera movement is detected and the system proceeds to block 198, the extent of the motion between the two images is determined using normalized cross-correlation (NCC). Because the transformation of the two images has already aligned the images in the manner predicted by the values representing $\Delta T_1$ and $\Delta P_1$, the process step of determining the motion that has occurred between the two images at box 198 corresponds to determining the value of $\Delta T_E$ and $\Delta P_E$.

Next, at block 200, the data for images $I_1$ and $I_2$ are swapped. The swapping of image data is done so that when a new image is grabbed and placed in the buffer after completing the translation of block 202, the new image and data associated therewith will overwrite the image and data associated with the older of the two images already present in the buffer.

Block 202 represents the translation of the display image boundaries on the CCD image of the most recently acquired image by amounts equivalent to $\Delta T_E$ and $\Delta P_E$ to thereby provide a stabilized video image.

The process then returns to block 184 where the first flag will no longer be true and the process will proceed to block 208 where a single new image will be grabbed and will overwrite image 12 in the buffer. Processor 62 then proceeds to block 210 where the smoothing filter is applied to the new image. Block 212 represents the acquisition of the pan, tilt and zoom settings of the camera at the time the new image was acquired by the camera. The process then proceeds to block 192.

In the exemplary embodiment, camera 22 is continually acquiring new images and the computational analysis performed by processing device 50 to compare the current image with a previously acquired image takes longer than the time interval between the individual images acquired by camera 22. When processing device 50 completes its analysis of a set of images, it grabs the most recently acquired image for the next analysis. Thus, there may be one or more images that are captured and communicated by camera 22 that were captured between two images that are sequentially grabbed by processing device 50 for analysis. As a result, when it is determined at block 198 (in the flow chart of FIG. 5) that the display boundaries for the current image require adjustment to correct for the unintentional movement of the camera, several additional images will be acquired by camera 22 and displayed on monitor screen 38 before the next image stabilization analysis is completed. Setting the location of the display boundary in these additional unanalyzed images can be done in different manners. For example, the display boundary used with these additional images utilize the adjusted boundary position, e.g., display boundary 100, that resulted from the analysis of the last two grabbed images could be employed with the unanalyzed images until the stabilization process positively determined that the display boundary should be readjusted. Alternatively, after altering the display boundary for the one image which was specifically analyzed and determined to have been influenced by unintentional camera movement, the display boundary could be immediately returned to its centered location in the CCD display. In other words, the display boundary would remain at its centered location for all images except for those specific images which have been grabbed, analyzed and determined to have been affected by unintentional camera movement and for which an altered display image boundary is specifically determined. It is also possible for the display boundary to be returned to the centered location in the CCD image boundary in incremental amounts, over several sequentially acquired images, after the display boundary has been adjusted to account for unintentional camera movement.

In most surveillance camera applications, it is anticipated that the types of vibrations and other external forces acting on the camera will cause unintentional camera movements that have a very brief deviation from the intended position with possible oscillations about an equilibrium position corresponding to the intended position of the camera. In this type of situation, having the display boundary return immediately to the centered location can be beneficial. Returning to the centered position may not only reflect the underlying unintentional camera motion and thus facilitate the display of a stabilized image, it also prevents migration of the display boundaries to the edge of the CCD display image which could limit the effectiveness of the image stabilization process and could result from a process which does not return the display image boundaries to a centered location in the CCD image.

An automated video tracking system, in which a feature may be tracked automatically, i.e., without a human performing the tracking such as by use of a joystick, may be referred to as "autotracking". In another embodiment of the present invention, the autotracking and stabilization functions are combined into a single "stabilized autotracker" (SAT) algorithm. SAT may include four integrated software components: autotracker (AT) engine, stabilization software, virtual masking (VM) software, and SAT executive. Stabilization and AT may work separately, or simultaneously, as dictated by the SAT Executive.

A major advantage of the stabilized autotracker of the present invention is that it eliminates corner matching which may be used to compute the homography matrix. In the stabilized autotracker embodiment, frame accurate camera position (pan, tilt, zoom) may be used to generate the homography matrix. This is very desirable as approximately 50% of the processing execution cycle may be attributed to corner matching. Thus the elimination of corner matching alone, not taking into account the differences in CPU speed, may result in a doubling of the processing rate, such as from five frames per second to ten frames per second, for example.

Figure 7:
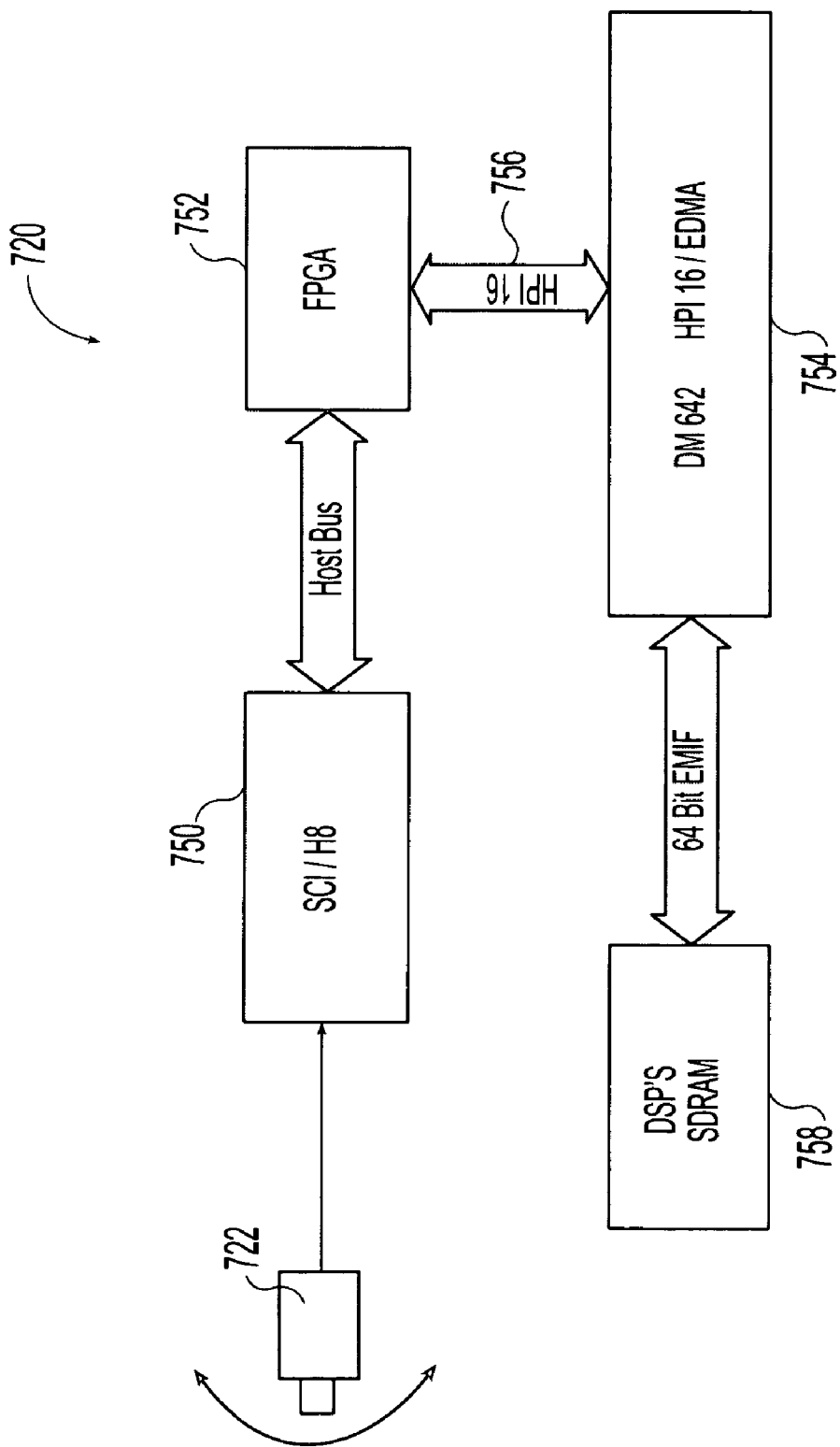
FIG. 7 is a block diagram of one embodiment of a video image stabilization system of the present invention.

A block diagram of one embodiment of a video image stabilization system 720 of the invention for performing frame accurate PTZ data transfer is shown in FIG. 7. A PTZ camera 722 may be in the form of a Philips AutoDome® Camera Systems brand camera system, such as the G4 AutoDome® camera and enclosure, which are available from Bosch Security Systems, Inc. formerly Philips Communication, Security & Imaging, Inc. having a place of business in Lancaster, Pa. Camera 722 may have, or be in communication with, three circuit boards, including a communication board, a system controller board, and a Video Content Analysis (VCA) board. The VCA board may include a digital signal processor (DSP), such as a DM642 600 MHz processor available from Texas Instruments of Dallas, Tex. More particularly, camera 722 may send captured images and/or a motor position message to a host 750. Camera 722 may perform auto zoom reporting at a limit of 9600 baud, and each video frame may have a duration of 33.33 ms (NTSC) or 40 ms (PAL), for example.

The perceived zoom data may be transferred to field-programmable gate array (FPGA) 752 as soon as a zoom auto report is received and the perceived focal length is calculated. The perceived zoom data may be sent to FPGA 752 as two sixteen bit words.

There may be an autosend of the PTZ data by FPGA 752 to a digital signal processor (DSP) 754 via a host port interface (HPI) 756. As soon as the perceived data is received by FPGA 752, it may be combined with pan and tilt data, and may be sent as six sixteen bit words. The DSP interrupt may be set by FPGA 752. DSP 754 may have an SDRAM memory device 758 associated therewith.

The maximum frame delay from a frame may be approximately 6.3 milliseconds (ms), comprised primarily of a camera auto report having a duration of approximately 6.25 ms. Other components of the frame delay may include the interrupt latency of host 750 (1 µs), host processing (1 µs), FPGA writes (0.4 µs), FPGA transaction wait (0.4 µs), FPGA processing time (1 µs), EDMA sharing delays (0.5 µs), and DSP interrupt latency (1 µs).

HPI 756 may expose Video Content Analysis (VCA) RAM to read/write access for SC (System Controller), via FPGA 752. As such, VCA may reserve and publish fixed addresses for System Controller reference. These addresses may provide access to VCA RAM, with interrupts used to indicate new data.

The most frequently transferred data between SC and VCA may include dynamic data, such as camera position, and a status word (with bits such as Motion Detection disabled).

VCA may also require large tables of data, which SC prepares at startup and subsequently notifies VCA when they are ready to be read. These tables may also be updated during operation, in which case the same notification technique may be used. Finally, VCA serial I/O, may be facilitated via the SC serial port. However, SC may have no interaction with the serial data, acting only as a pass-through agent.

The autotracker may process Quarter Common Intermediate Format (QCIF) images when stabilization is off, and 85% QCIF stabilized images when stabilization is turn on. Also, since the input to the autotracker may be "raw" video (i.e., without on screen display icons), most of the image may be used for tracking, as opposed to the top 30 lines not being usable because they are occupied with icons, text, etc.

In addition to the QCIF images, inputs to the autotracker algorithm include the camera pan, tilt and zoom positions, the camera height, and virtual masks. Outputs of the autotracker algorithm include the camera pan, tilt and zoom commands, and the autotracker state, e.g., OFF, Looking, Tracking, Fatal Error.

Figure 8:
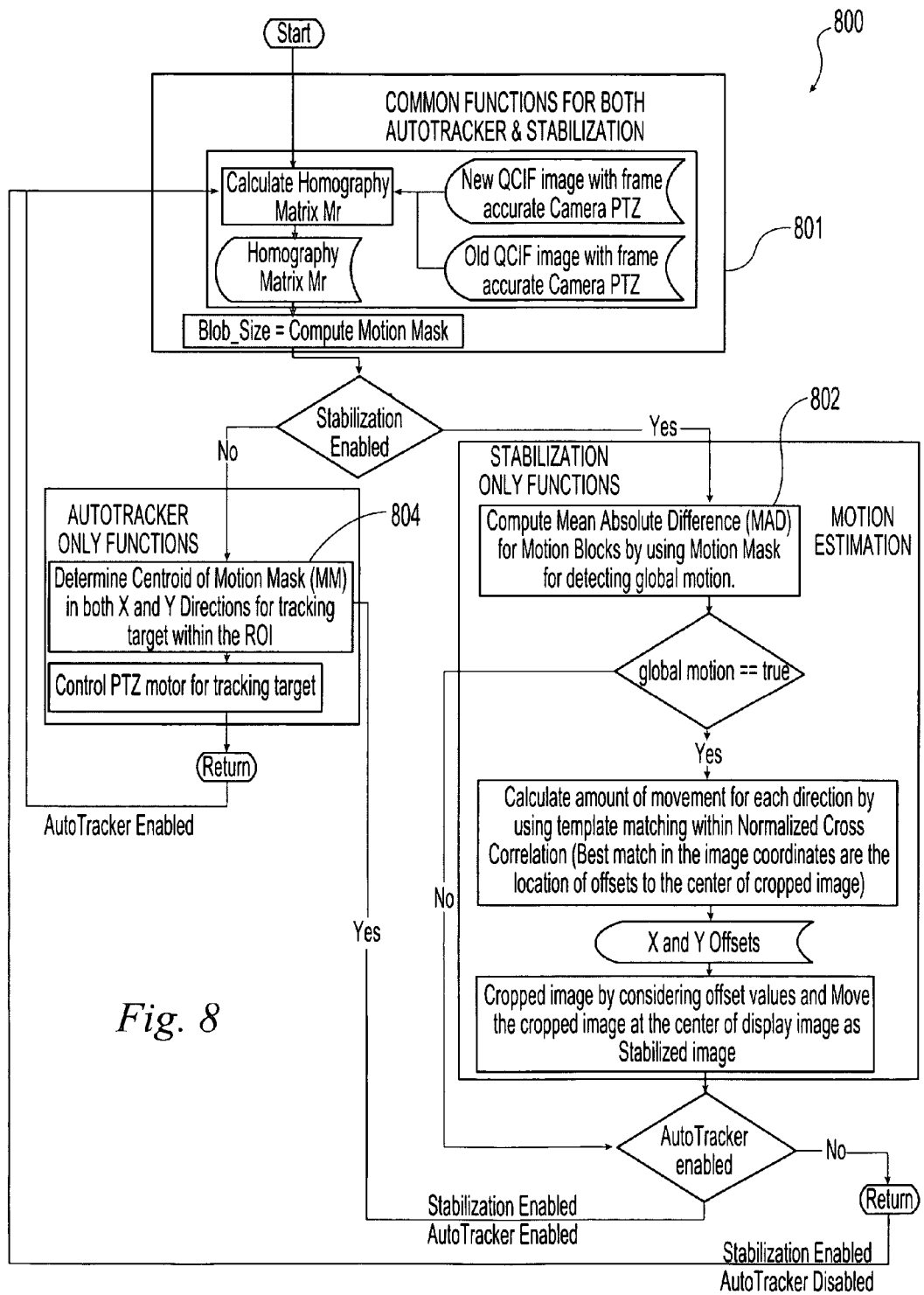
FIG. 8 is a flow chart of one embodiment of a stabilized autotracker method of the present invention.

FIG. 8 is a flow chart of one embodiment of a stabilized autotracker method 800 of the present invention. In a first step 801, a homography matrix is calculated based on a frame accurate position hardware-based technique. The last substep of step 801 (Blob_Size=Compute Motion Mask) corresponds to the motion detection method illustrated in FIG. 10.

One embodiment of a software module for executing step 802 is as follows:

```
k=0;
bl_count = 0;
global_motion = FALSE;
float MAD[6][8] - initialize all to zero.
blockSize = 10
for (i=0; i<CntrdH; i++)
{
        if (i%blockSize == 0)
                k++;
        l=0;
        for (j=0; j<CntrdW; j++ )
        {
                if(j%blockSize == 0)
                        j++;
                imgNdx = i*CntrdW+j;
//              if( abs( ImgCentroid[0].pImg[imgNdx]-
                        ImgCentroid[1].pImg
                                [imgNdx])>STB_Threshold)
                        if( MM[imgNdx] l = 0 )
                                MAD[k–l][l–l]++;
        }
}
for ( i=0; i<6; i++ )
        for (j=0; j<8; j++ )
                if ( MAD[i][j] < 20 )
                        bl_count++;
if (bl_count > 10)
        global_motion = TRUE; // there is no global motion
```

One embodiment of a software module for executing step 804 is as follows:

```
                (Basically the end of Compute_Motion_Mask( ).......
        for(i=top_row; i<bottom_row; i++)
        {
                //point to start of each row, then add the left column
        //offset.
                offset = (i*m_cmd_width) + left_col;
                        for(j=left_col; j<right_col;j++)
                        {
                if (MM[offset] )
                                {
                                        sum++;
                                                vp[i]++;
                                                hp[j]++;
                                }
        //move across the row to the next column.
                                offset++;
                        }//j index
        }// i index
        if(sum>5)
        {
                center.x =
                GetMedianAndSigmaFromCountingSort(sum, hp, hp1, &sgh,
                                                m_cmd_width; //160);
                center.y =
                GetMedianAndSigmaFromCountingSort(sum, vp, vp1, &sgv,
                                                m_cmd_height; //105);
                axes.width = int(sgh);
                axes.height = int(sgv);
                //Compute how far the center of motion has moved.
                int xdiff=abs(tempcenter.x–center.x);
                int ydiff=abs(tempcenter.y–center.y);
//This computes the "target consistency".
                //The target is inconsistent if
                //1) The target is too big - OR -
                //2) The target has moved too far
                        if((axes.width < e1 && axes.height < e2)&&
                                (xdiff<e4 && ydiff<e3))
                                m_Target_Consistency_Flag =
                                TARGET_IS_CONSISTENT;
                        else
                                m_Target_Consistency_Flag =
                                TARGET_IS_NOT_CONSISTENT;
        tempaxes.width=axes.width;
                tempaxes.height=axes.height;
                tempcenter.x=center.x;
                tempcenter.y=center.y;
        }
//      End of Computing Median of the image
                else
                {
                        m_Target_Consistency_Flag =
                        TARGET_IS_NOT_CONSISTENT;
                        bilinear_mapping(M.a, center.x, center.y, &cx, &cy);
                        center.x = int(cx+.1);
                        center.y = int(cy+.1);
                }
```

Stabilization is the process whereby structural movement of the entire camera, i.e., "global" movement, may be dampened for presentation to the user. Stabilization may share much of the same video processing as autotracker (AT), and, therefore, stabilization and autotracker may be closely integrated. AT may determine if image stabilization is required and if stabilization is enabled. To stabilize an image, AT may pass a "raw" QCIF image to the stabilization algorithm, which may be used to match a half-size, warped "template", using cross correlation techniques. XY offsets may be generated via normalized cross correlation (NCC) and passed back to the AT algorithm. The template may be updated from the latest QCIF whenever the NCC score falls below a validity threshold, or when the camera position changes beyond a fixed threshold. Stabilization may also use the XY offsets to construct a stabilized D1 (720 by 480 pixels (National Television System Committee) or 720×576 (Phase Alternating Line)) output image, which may be cropped to compensate for the XY offsets.

In one embodiment of stabilization, a template measuring 160 by 120 pixels, for example, is provided within a same, predetermined area of each captured image. After compensating or accounting for known PTZ movements of the camera between two sequentially captured images, any global movements within the templates may be assumed to be due to jitter, i.e., unintentional movement or vibration. Instead of searching for a corner or some type of fixed object within the template images, the color, lightness and/or intensity values of each pixel in each of the two template images may be examined in order to determine whether there is a global positional shift in the values between the two template images. Any such global positional shift in the values between the two template images may be an indication that there was unintentional camera movement during the time interval between the capturing of the two images. The stabilization algorithm may effectively, via manipulation of the image data, reverse the positional shift in the image values that is due to unintentional movement. This reversal of the positional shift in the image data may effectively remove any perceptible jitter in the displayed images and stabilize the displayed images.

Figure 9:
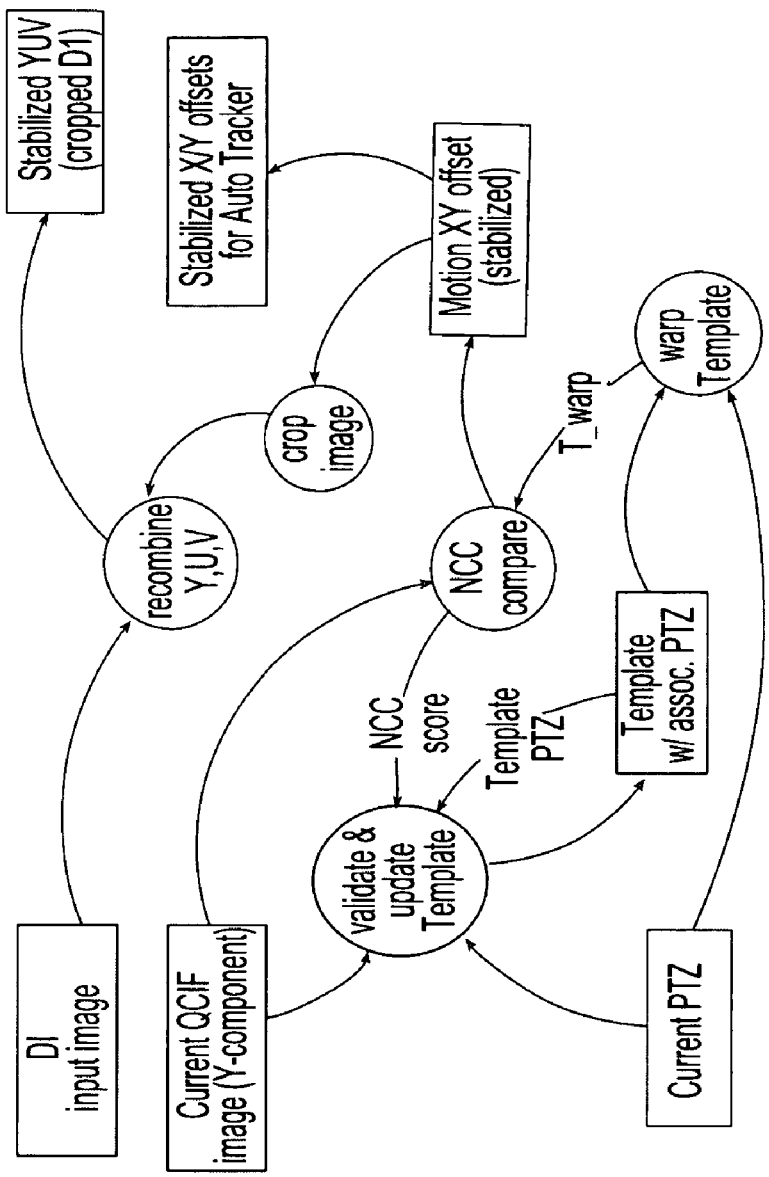
FIG. 9 is a data flow diagram of one embodiment of a stabilization algorithm of the present invention.

Inputs to the stabilization may include the D1 image, YUV colorspace components, the QCIF image, the Y component, and the current PTZ positions. Outputs of the stabilization may include the stabilized image YUV color components, and stabilized Y-component X/Y offsets for autotracker. FIG. 9 is a data flow diagram of one embodiment of the stabilization algorithm of the present invention.

Motion detection may be accomplished via the autotracker algorithm. Instead of providing PTZ commands to the system controller when motion is detected, the VCA may provide a motion notification. This motion detector may be able to specify regions of interest and find motion specifically assigned in the region of interest (ROI). The algorithms for drawing regions of interest may be similar as those used by the privacy masking software on the system controller central processing unit (CPU).

The ROI motion detection algorithm may differ from privacy masks in two important aspects. First, wherein privacy masks may be applied directly to input video to prevent the user from seeing what is behind the masks, the ROI motion detection may be applied directly to the computed motion mask to inhibit motion detection software from having the interested areas contribute to detected motion. Second, ROI motion mask positions are not warped and dynamically changed depending upon camera position changes. The positions of ROIs are fixed onto the motion mask based upon the preset camera positions.

Inputs to the motion detection may include the motion mask that is computed by the autotracker. The ROI may also be an input to the motion detection. Each ROI may include a set of vertices, the number of vertices, and the camera preset position number when the ROI was created. Another input to the motion detection may be the p_Number, i.e., the current camera preset position number.

Figure 10:
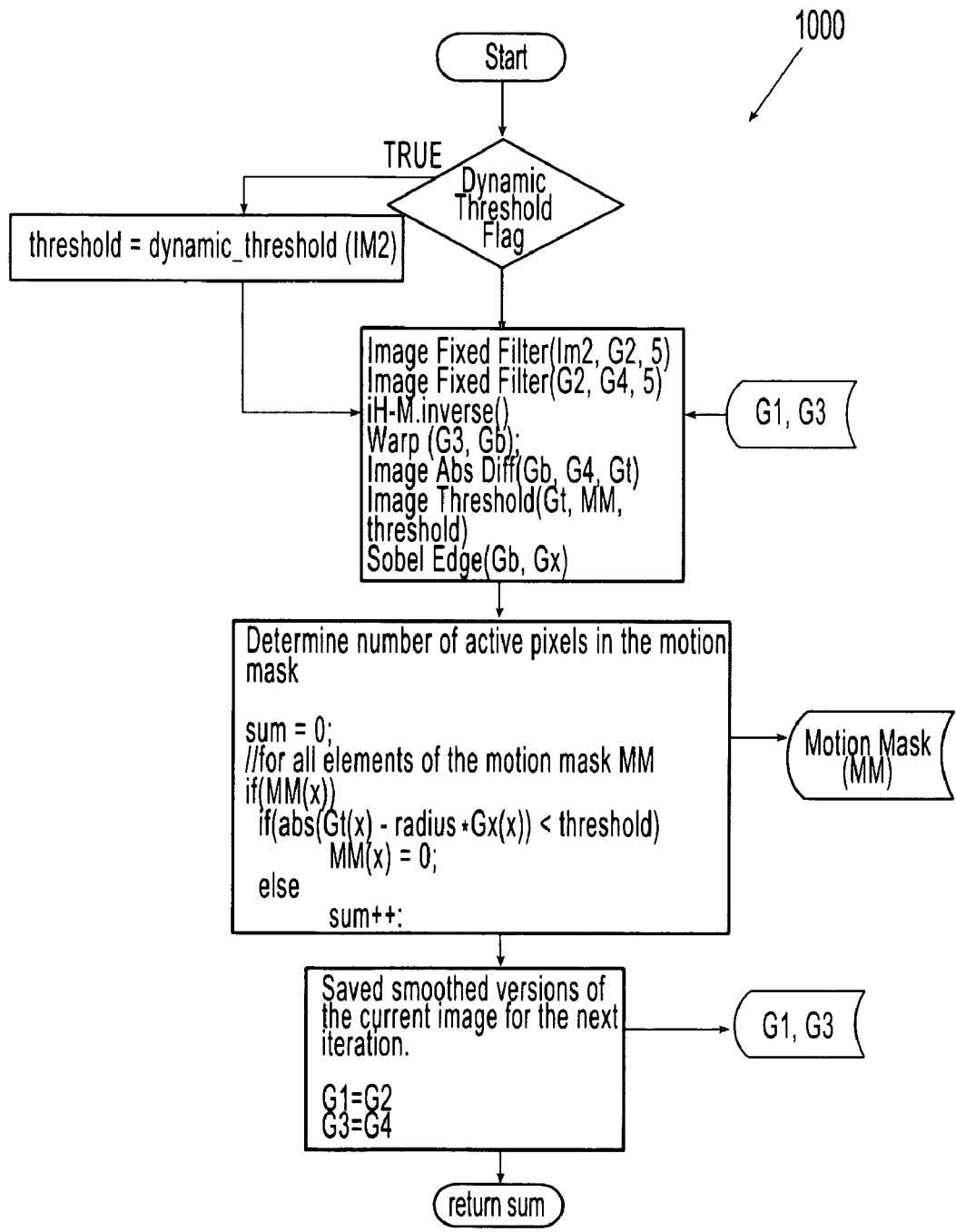
FIG. 10 is a flow chart of one embodiment of a motion detection method of the present invention.

The output of the motion detection system may be an indication of whether or not motion is present in the ROI. Motion outside of the ROI is not considered. With regard to the data structure of the motion detection, each ROI may be formed of a set of vertices, the number of vertices, and the camera preset position when the mask was created. FIG. 10 is a flow chart of one embodiment of a motion detection method 1000 of the present invention.

While this invention has been described as having an exemplary design, the present invention may be further modified within the spirit and scope of this disclosure. This application is therefore intended to cover any variations, uses, or adaptations of the invention using its general principles.

What is claimed is:

1. A video image stabilization system comprising:
a camera including an image capturing device configured to capture a video image, said camera having a selectively adjustable field of view; and
a processing device operably coupled to said camera wherein said processing device receives signals indicative of the field of view of said camera and images captured by said camera, said processing device automatically tracking movements of at least one object in the images, said processing device determining a stabilizing adjustment for the video image as a function of an unintended change in the field of view of said camera during a time interval between capture of a first image and capture of a second image, the determining being based upon said signals indicative of the field of view and an analysis of said first and second images, the analysis of said first and second images including aligning one of said first and second images with an other of said first and second images based upon said signals indicative of the field of view and determining if said aligned images indicate an occurrence of unintentional camera movement by determining an image difference of said aligned images, said processing device generating a histogram of said image difference of said aligned images and determining whether unintentional camera movement has occurred based upon identifying a maximum peak in said histogram and a location of said maximum peak, and wherein when said maximum peak is not substantially centered on zero, unintentional camera movement is determined to have occurred and wherein determination of said stabilizing adjustment includes identifying adjustments that reduce the image difference.

2. The video image stabilization system of claim 1 wherein a display portion of each image captured by said camera is selected for display, said selected display portion of each image comprising less than the entire captured image and wherein said stabilizing adjustment determined by said processing device comprises adjusting a relative location of said selected display portion within said captured image.

3. The video image stabilization system of claim 1 wherein said camera has a selectively adjustable pan position, a selectively adjustable tilt position and a selectively adjustable focal length.

4. The video image stabilization system of claim 3 wherein at least one of the pan position, the tilt position, and the focal length of said camera is intentionally adjusted between the capture of said first and second images.

5. The video image stabilization system of claim 1 wherein the analysis of the first and second images includes determining the unintended change in the field of view of said camera during the interval between the capture of the first image and the second image.

6. The video image stabilization system of claim 1 wherein the analysis of the first and second images includes finding a pixel-to-pixel correspondence between portions of the first and second images.

7. The video image stabilization system of claim 1 wherein said signals indicative of the field of view comprise pan, tilt and focal length settings of said camera for each captured image, said signals being communicated to said processing device from said camera on an image-synchronized basis.

8. The video image stabilization system of claim 1 wherein said camera is moveably mounted on a stationary support.

9. The video image stabilization system of claim 1, wherein the analysis of the first and second images further includes compensating for known movements of the camera between the first and second images based on the signals indicative of the field of view.

10. A method of stabilizing video images, said method comprising:

capturing a plurality of images with a video camera;

identifying a location of an object in each of a first captured image and a second captured image;

adjusting a field of view of the camera during a time interval between the capture of the first image and the capture of the second image;

displaying a selected display portion of the first captured image and the second captured image, the selected display portion of each image being less than the entire captured image, at least one of the adjusting and displaying steps being dependent upon said identifying step; and determining a stabilizing adjustment for the second captured image dependent upon said adjusting step and an analysis of the first and second captured images wherein the stabilizing adjustment includes adjusting a relative location of the selected display portion within the second captured image, said determining step including ascertaining an unintended change in the field of view of said camera during the time interval between the capture of the first image and the second image by aligning one of the first and second images with an other of the first and second images based upon signals indicative of the field of view, and detecting whether the aligned images indicate an occurrence of unintentional camera movement by determining an image difference of the aligned images and generating a histogram of the image difference of the aligned images and determining whether unintentional camera movement has occurred based upon identifying a maximum peak in the histogram and a location of the maximum peak, wherein when the maximum peak is not substantially centered on zero, unintentional motion is determined to have occurred and wherein determination of said stabilizing adjustment includes identifying adjustments that reduce the image difference.

11. The method of claim 10 wherein the camera defines a pan position and a tilt position, said adjusting step including adjusting at least one of the pan position, the tilt position, and a focal length of the camera during the time interval between the capture of the first and second images.

12. The method of claim 10 wherein said determining step includes finding a pixel-to-pixel correspondence between portions of the first and second images.

13. The method of claim 10, wherein said determining step includes compensating for known movements of the camera between the first and second images based on signals indicative of the field of view.

* * * * *